(12) United States Patent
Schmitt et al.

(10) Patent No.: US 11,188,648 B2
(45) Date of Patent: Nov. 30, 2021

(54) TRAINING A SECURITY SCAN CLASSIFIER TO LEARN AN ISSUE PREFERENCE OF A HUMAN AUDITOR

(71) Applicant: ENTIT Software LLC, Sunnyvale, CA (US)

(72) Inventors: Michael Jason Schmitt, Sunnyvale, CA (US); Guy Wiener, Haifa (IL); Emil Kiner, Sunnyvale, CA (US); Tomer Priel, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 925 days.

(21) Appl. No.: 15/751,614

(22) PCT Filed: Aug. 12, 2015

(86) PCT No.: PCT/US2015/044877
§ 371 (c)(1),
(2) Date: Feb. 9, 2018

(87) PCT Pub. No.: WO2017/027029
PCT Pub. Date: Feb. 16, 2017

(65) Prior Publication Data
US 2021/0073383 A1 Mar. 11, 2021

(51) Int. Cl.
*H04L 29/06* (2006.01)
*G06F 21/56* (2013.01)
(Continued)

(52) U.S. Cl.
CPC ............ *G06F 21/566* (2013.01); *G06F 21/54* (2013.01); *G06F 21/568* (2013.01); *G06K 9/6256* (2013.01); *G06K 9/6263* (2013.01)

(58) Field of Classification Search
CPC ........ G06F 21/566; G06F 21/54; G06F 21/55; G06F 21/568; G06F 21/60; G06F 21/12;
(Continued)

(56) References Cited

U.S. PATENT DOCUMENTS 6,779,117 B1 * 8/2004 Wells ................... G06F 21/51
709/223
7,490,356 B2 * 2/2009 Lieblich ................ G06F 21/316
379/93.02
(Continued)

FOREIGN PATENT DOCUMENTS

WO WO-2014090072 A1 6/2014

OTHER PUBLICATIONS

Sasikala, S., et al., A Machine Learning Techniquer for Generative Classifier Under Attack, Mar. 3, 2015, International Journal of Engineering and Computer Science, vol. 4, Issue 3, pp. 10992-10997.
(Continued)

*Primary Examiner* — Hosuk Song (57) ABSTRACT

A technique includes receiving data representing an output of a security scan of an application and an audit of the security scan by a human auditor. The output represents a security issue with the application, which is identified by the security scan, and the audit represents an analysis of the security issue by the human auditor. The technique includes training a security scan classifier to learn a classification preference of the human auditor. Training the security scan classifier includes, processing the data in a processor-based machine to, based at least in part on the output of the security scan and the analysis of the security scan by the human auditor, learn the classification preference of the human auditor to the issue to build a classification model for the issue.

20 Claims, 9 Drawing Sheets

(51) Int. Cl.
*G06F 21/54* (2013.01)
*G06K 9/62* (2006.01)

(58) Field of Classification Search
CPC . G06F 21/125; G06K 9/6256; H04L 63/1416; H04L 63/143
See application file for complete search history.

(56) References Cited

U.S. PATENT DOCUMENTS

| | | | |
|---|---|---|---|
| 7,712,138 B2* | 5/2010 | Zobel | H04L 63/1433 726/25 |
| 8,813,235 B2 | 8/2014 | Sidagni | |
| 8,875,286 B2 | 10/2014 | Friedrichs et al. | |
| 8,918,886 B2 | 12/2014 | Pistoia et al. | |
| 8,984,628 B2* | 3/2015 | Mahaffey | G06F 21/564 726/22 |
| 10,320,813 B1* | 6/2019 | Ahmed | H04L 63/1441 |
| 2007/0157311 A1 | 7/2007 | Meier et al. | |
| 2007/0192613 A1 | 8/2007 | Amoroso et al. | |
| 2010/0017877 A1 | 1/2010 | Cooley et al. | |
| 2015/0172307 A1 | 6/2015 | Borohovski et al. | |

OTHER PUBLICATIONS

U.S. OIS, Secure Code Review Standard Operating Procedures, Jun. 2014, U.S. Office of Information Security, 15 pages.
Vinchurkar, D.P., et al., A Review of Intrusion Detection System Using Neural Network and Machine Learning Technique, Nov. 2012, International Journal of Engineering Science and Innovative Technology, vol. 1, Issue 2, 10 pages.
International Searching Authority., International Search Report and Written Opinion dated May 3, 2016 for PCT Application No. PCT/US2015/044877 Filed Aug. 12, 2015, 12 pages.

* cited by examiner

TRAINING A SECURITY SCAN CLASSIFIER TO LEARN AN ISSUE PREFERENCE OF A HUMAN AUDITOR

BACKGROUND

A given application may have a number of potentially exploitable vulnerabilities, such as vulnerabilities relating to cross-site scripting, command injection or buffer overflow, to name a few. For purposes of identifying at least some of these vulnerabilities, the application may be processed by a security scanning engine, which may perform dynamic and static analyses of the application.

DETAILED DESCRIPTION

An application security scanning engine may be used to analyze an application for purposes of identifying potential exploitable vulnerabilities (herein called "issues") of the application. In this manner, the application security scanning engine may provide security scan data (a file, for example), which identifies potential issues with the application, as well as the corresponding sections of the underlying source code (machine-executable instructions, data, parameters being passed in and out of a given function, and so forth), which are responsible for these risks. The application security scanning engine may further assign each issue to a priority bin. In this manner, the application security scanning engine may designate a given issue as belonging to a low, medium, high or critical priority bin, thereby denoting the importance of the issue.

Each issue that is identified by the application security scanning engine may generally be classified as being either "out-of-scope" or "in-scope." An out-of-scope issue is ignored or suppressed by the end user of the application scan. An in-scope issue is viewed by the end user as being an actual vulnerability that should be addressed.

There are many reasons why a particular identified issue may be labeled out-of-scope, and many of these reasons may be independent of the quality of the scan output. For example, the vulnerability may not be exploitable/reachable because of environmental mitigations, which are external to the scanned application; the remediation for an issue may be in a source that was not scanned; custom rules may impact the issues returned; and inherent imprecision in the math and heuristics that are used during the analysis may impact the identification of issues.

In general, the application scanning engine generates the issues according to a set of rules that may be correct, but possibly, the particular security rule that is being applied by the scanning engine may be imprecise. The "out-of-scope" label may be viewed as being a context-sensitive label that is applied by a human auditor. In this manner whether a given issue is out-of-scope, may involve determining whether the issue is reachable and exploitable in this particular application and in this environment, given some sort of external constraints. Therefore, the same issue for two different applications may be considered "in-scope" in one application, but "out-of-scope" in the other; but nevertheless, the identification of the issue may be a "correct" output as far as the application scanning engine is concerned. In general, human auditing of security scan results may be a relatively highly skilled and time-consuming process, relying on the contextual awareness of the underlying source code.

One approach to allow the security scanning engine to scan more applications, prioritize results for remediation faster and allow human security experts to spend more time analyzing and triaging relatively high risk issues, is to construct or configure the engine to perform a less thorough scan, i.e., consider a fewer number of potential issues. Although intentionally performing an under-inclusive security scan may result in the reduction of out-of-scope issues, this approach may have a relatively high risk of missing actual, exploitable vulnerabilities of the application.

In accordance with example implementations that are discussed herein, in lieu of the less thorough scan approach, machine-based classifiers are used to prioritize application security scan results. In this manner, the machine-based classifiers may be used to perform a first order prioritization, which includes prioritizing the issues that are identified by a given application security scan so that the issues are classified as either being in-scope or out-of-scope. The machine-based classifiers may be also used to perform second order prioritizations, such as, for example, prioritizations that involve assigning priorities to in-scope issues. For example, in accordance with example implementations, the machine-based classifiers may assign a priority level of "1" to "6" (in ascending level of importance, for example) to each issue in a given priority bin (priorities may be assigned to issues in the critical priority bin, for example). The machine-based classifiers may also be used to perform other second order prioritizations, such as, for example, reprioritizing the priority bins. For example, the machine-based classifiers may re-designate a given "in-scope" issue as belonging to a medium priority bin, instead of belonging to a critical priority bin, as originally designated by the application security scanning engine.

In accordance with example implementations that are described herein, the machine-classifiers that prioritize the application security scan results are trained on historical, human audited security scan data, thereby imparting the classifiers with the contextual awareness to prioritize new, unseen application security scan-identified issues for new, unseen applications. More specifically, in accordance with example implementations that are disclosed herein, a given machine classifier is trained to learn the issue preferences of one or multiple human auditors.

Figure 1A:
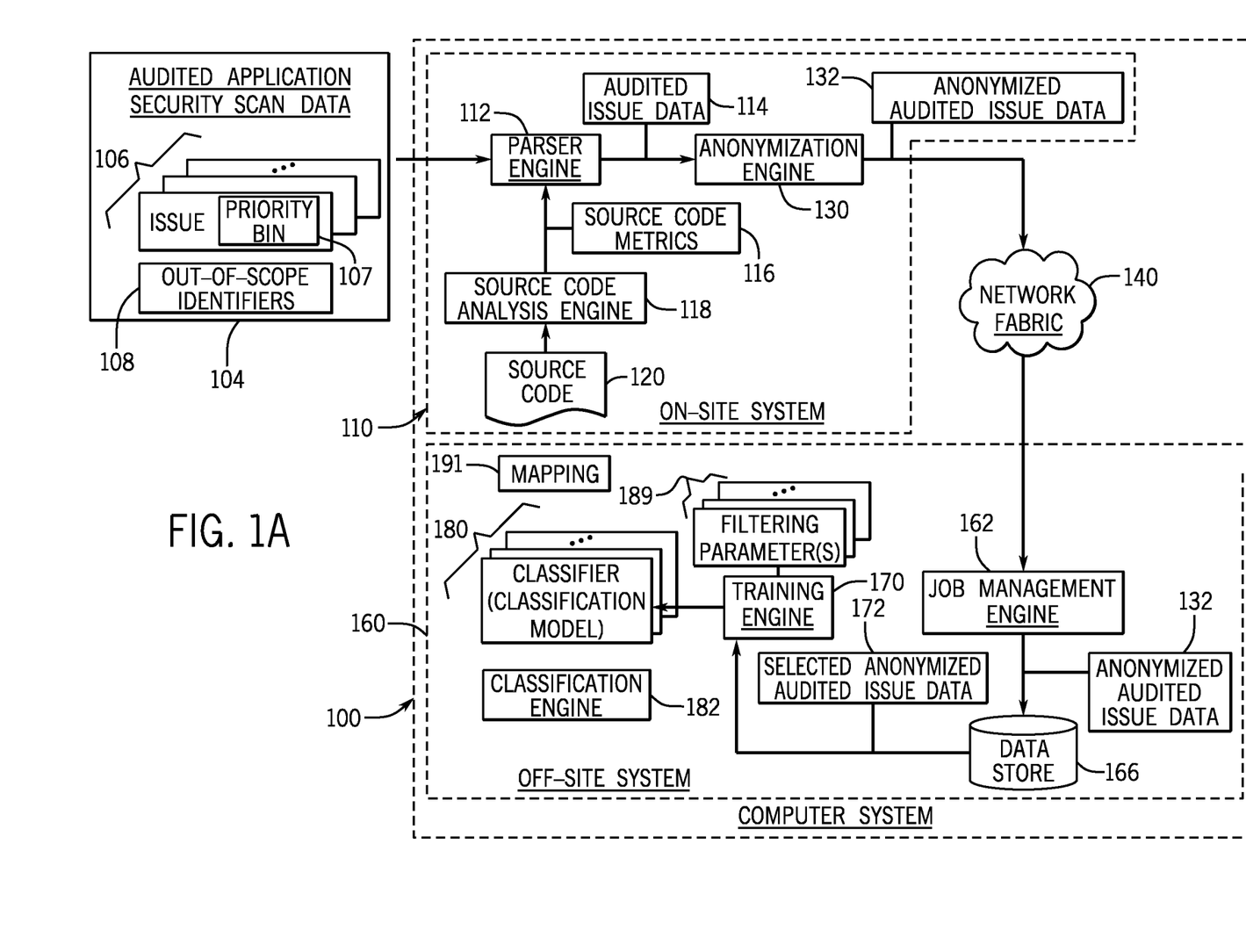
FIG. 1A is a schematic diagram of a computer system used to prioritize issues identified by an application security scan illustrating the use of human audited issue data to train machine classifiers used by the system according to an example implementation.

Referring to FIG. 1A, as a more specific example, in accordance with some implementations, a computer system 100 prioritizes application security scan data using machine classifiers 180 (i.e., classification models) and trains the classifiers 180 to learn the issue preferences of human auditors based on historical, human audited application scan data. More specifically, for the example implementation of FIG. 1A, the computer system 100 includes one or multiple on-site systems 110 and an off-site system 160.

As a more specific example, the off-site system 162 may be a cloud-based computer system, which applies the classifiers 180 to prioritize applicant scan issues for multiple clients, such as the on-site system 110. The clients, such as on-site system 110, may provide training data (derived from human audited application scan data, as described herein) to the off-site system 162 for purposes of training the classifiers 180; and the clients may communicate unaudited (i.e., unlabeled, or unclassified) application security scan data to the off-site system 160 for purposes of using the off-site system's classifiers 180 to prioritize the issues that are identified by the scan data. Depending on the particular implementation, the on-site system 110 may contain a security scanning engine or access scan data is provided by an application scanning engine.

As depicted in FIG. 1A, the on-site system 110 and off-site system 160 may communicate over network fabric 140, such as fabric associated with wide area network (WAN) connections, local area network (LAN) connections, wireless connections, cellular connections, Internet connections, and so forth, depending on the particular implementation. It is noted that although one on-site system 110 and one off-site system 160 are described herein for an example implementation, the computer system 100 may be entirely disposed at a single geographical location. Moreover, in accordance with further example implementations, the on-site system 110 and/or the off-site system 160 may not be entirely disposed at a single geographical location. Thus, many variations are contemplated, which are within the scope of the appended claims.

FIG. 1A specifically depicts the communication of data between the on-site system 110 and the off-site system 160 for purposes of training the off-site system's classifiers 180. More specifically, for the depicted example implementation, the on-site system 110 accesses human audited application security scan data 104. In this manner, the human audited application security scan data 104 may be contained in a file that is read by the on-site system 110. The audited application security scan data 104 contains data that represents one or multiple vulnerabilities, or issues 106, which were identified by an application scanning engine (not shown) by scanning source code of an application.

In this manner, each issue 106 identifies a potential vulnerability of the application, which may be exploited by hackers, viruses, worms, inside personnel, and so forth. As examples, these vulnerabilities may include vulnerabilities pertaining to cross-site scripting, standard query language (SQL) injection, denial of service, arbitrary code execution, memory corruption, and so forth. As depicted in FIG. 1A, in addition to identifying a particular issue 106, the audited application security scan data 104 may represent a priority bin 107 for each issue 106. For example, the priority bins 107 may be "low," "medium," "high," and "critical" bins, thereby assigning priorities to the issues 106 that are placed therein.

The audited application security scan data 104 contains data representing the results of a human audit of all or a subset of the issues 106. In particular, the audited application security scan data 104 identifies one or multiple issues 106 as being out-of-scope (via out-of-scope identifiers 108), which were identified by one or multiple human auditors, who performed audits of the security scan data that was generated by the application scanning engine. The audited application security scan data 104 may identify other results of human auditing, such as, for example, reassignment of some of the issues 106 to different priority bins 107 (originally designated by application security scan). Moreover, the audited application security scan data 104 may indicate priority levels for issues 106 in each priority bin 107, as assigned by the human auditors.

As an example, the audited application security scan data 104 may be generated in the following manner. An application (i.e., source code associated with the application) may first be scanned by an application security scanning engine (not shown) to generate application security scan data (packaged in a file, for example), which may represent the issues 106 and may represent the sorting of the issues 106 into different priority bins 107. Next, one or multiple human auditors may audit the application scan security data to generate the audited application security scan data 104. In this manner, the human auditor(s) may annotate the application security scan data to identify any out-of-scope issues (depicted by out-of-scope identifiers 108 in FIG. 1A), re-designate in-scope issues 106 as belonging to different priority bins 107, assign priority levels to the in-scope issues 106 in a given priority bin 107, and so forth.

Each issue 106 has associated attributes, or features, such as one or more of the following (as examples): the identification of the vulnerability, a designation of the priority bin 107, a designation of a priority level within a given priority bin 107, and the indication of whether the issue 106 is in-scope or out-of-scope. Features of the issues 106 such as these, as well as additional features (described herein), may be used to train the classifiers 180 to prioritize the issues 106. More specifically, in accordance with example implementations, as described herein, a classifier 180 is trained to learn a classification preference of a human auditor to a given issue based on features that are associated with the issue.

Each issue 106 is associated with one or multiple underlying source code sections of the scanned application, called "methods" herein (and which may alternatively be referred to as "functions" or "procedures"). In general, the associated method(s) are the portion(s) of the source code of the application that are responsible for the associated issue 106. A control flow issue is an example of an issue that may be associated with multiple methods of the application.

In accordance with example implementations, the off-site system 180 trains the classifiers 180 on audited issue data, which is data that represents a decomposition of the audited security scan data 104 into records: each record is associated with one issue 106 and the associated method(s) that are responsible for the issue 106; and each record contains data representing features that are associated with one issue 106 and the associated method(s).

The issue data may be provided by clients of the off-site system 160, such as the on-site system 110. More specifically, in accordance with example implementations, the on-site system 110 contains a parser engine 112 that processes the audited application security scan data 104 to generate audited issue data 114.

Figure 2:
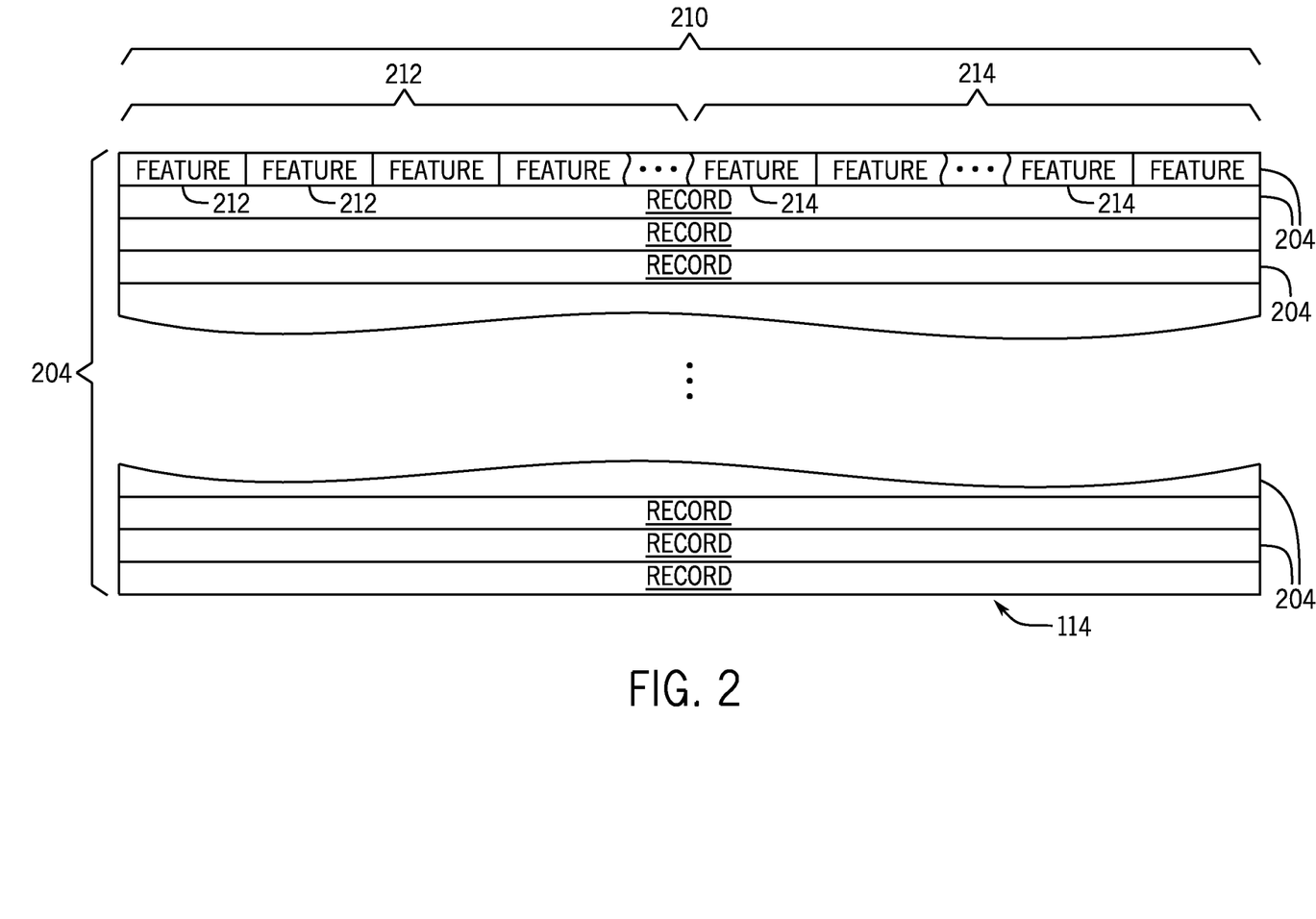
FIG. 2 is an illustration of issue data according to an example implementation.

Referring to FIG. 2 (illustrating the content of the audited issue data 114) in conjunction with FIG. 1A, in accordance with example implementations, the audited issue data 114 contains issue datasets, or records 204, where each record 204 is associated with a given issue 106 and its associated method(s), which are responsible for the issue 106. The record 204 contains data representing features 210 of the associated issue 106 and method(s).

Depending on the particular implementation, the features 210 may contain 1.) features 212 of the associated issue 106 and method(s), which are derived from the audited application security scan data 104; and 2.) features 214 of the method(s), which are derived from the source code independently from the application security scan data 104. In this manner, as depicted in FIG. 1A, in accordance with some implementations, the on-site system 110 includes a source code analysis engine 118, which selects source code 120 of the application associated with the method(s) to derive source code metrics 116 (i.e., metrics 116 describing the features of the method(s)), which the parser engine 112 uses to derive the features 214 for the audited issue data 114. In accordance with some implementations, the audited issue data 114 may not contain data representing the features 214.

As a more specific example, in accordance with some implementations, the features 212 of the audited issue data 114, which are extracted from the audited application security scan data 104, may include one or more of the following: an issue type (i.e., a label identifying the particular vulnerability); a sub-type of the issue 106; a confidence of the application security scanning engine in its analysis; a measure of potential impact of the issue 106; a probability that the issue 106 will be exploited; an accuracy of the underlying rule; an identifier identifying the application security scanning engine; and one or multiple flow metrics (data and control flow counts, data and control flow lengths, and source code complexity, in general, as examples).

The features 214 derived from the source code 120, in accordance with example implementations, may include one or more of the following: the number of exceptions in the associated method(s); the number of input parameters in the method; the number of statements in the method(s); the presence of a Throw expression in the method(s); a maximal nesting depth in the method(s); the number of execution branches in the method(s), the output type in the method(s), and frequencies (i.e., counts) of various source code constructs.

In this context, a "source code construct" is a particular programming structure. As examples, a source code construct may be a particular program statement (a Do statement, an Empty Statement, a Return statement, and so forth); a program expression (an assignment expression, a method invocation expression, and so forth); a variable type declaration (a string declaration, an integer declaration, a Boolean declaration and so forth); an annotation; and so forth. In accordance with example implementations, the source code analysis engine 118 may process the source code 120 associated with the method for purposes of generating a histogram of a predefined set of source code constructs; and the source code analysis engine 118 may provide data to the parser engine 112 representing the histogram. The histogram represents a frequency at which each of its code constructs appears in the method. Depending on the particular implementation, the parser engine 112 may generate audited issue data 114 that includes frequencies of all of the source code constructs that are represented by the histogram or include frequencies of a selected set of source code constructs that are represented by the histogram.

In accordance with example implementations, the source code analysis engine 118 may generate data that represents control and data flow graphs from the analyzed application and which may form part of the features 214 derived from the source code 120. The properties of these graphs represent the complexity of the source code. As examples, such properties may include the number of different paths, the average and maximal length of these paths, the average and maximal branching factor within these paths, and so forth.

Figure 3:
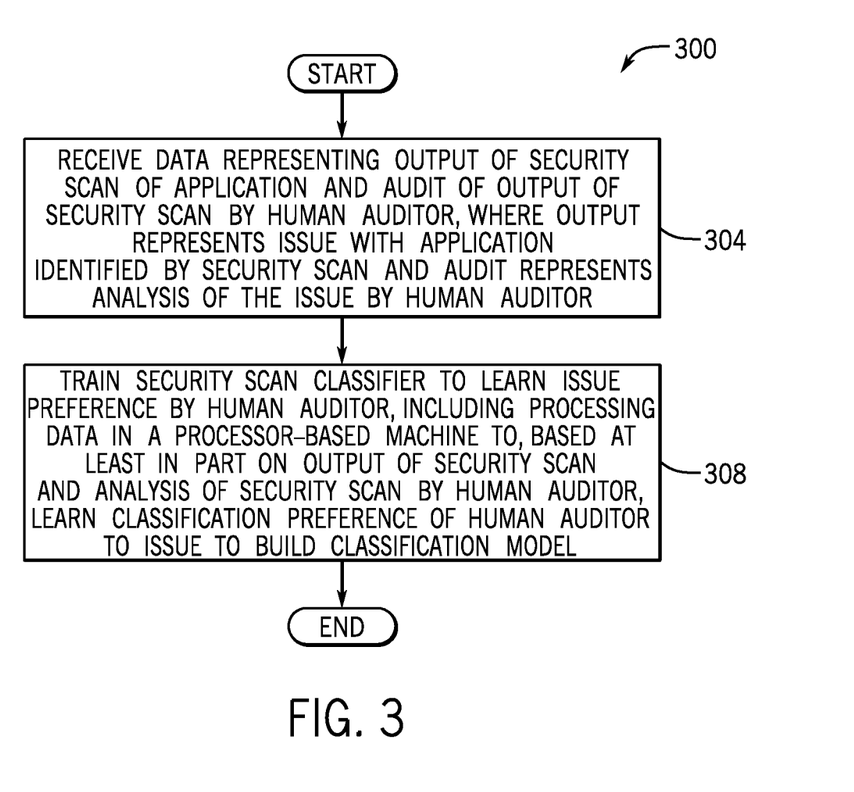
FIGS. 3, 5, and 6 are flow diagrams depicting techniques to train machine classifiers according to example implementations.

As described further below, the off-site system 160 uses the audited issue data to train the classifiers 180 so that the classifiers 180 learn the classification preferences of the human auditors for purposes of prioritizing the issues 106. More specifically, referring to FIG. 3, in accordance with example implementations, a technique 300 to train a given security scan classifier includes receiving (block 304) data representing an output of a security scan of an application and an audit of the output of the security scan by a human auditor. The output represents an issue with the application, which is identified by the security scan, and the audit represents an analysis of the issue by the human auditor. The technique 300 includes training (block 308) the classifier to learn an issue preference of the human auditor. The training includes processing data in a processor-based machine to, based at least in part on the output of the security scan and the analysis of the security scan by the human auditor, learn the classification preference of the human auditor to the issue to build a classification model for the issue.

Referring back to FIG. 1A, in accordance with example implementations, the classifiers 180 may be trained using anonymized data. In this manner, in accordance with example implementations, data communicated between the on-site system 110 and off-site system 160 is anonymized, or sanitized, to remove labels, data and so forth, which may reveal confidential or business sensitive information, the associated entity providing the application, users of the application, and so forth. Due to the anonymization of human audited data scan, the off-site system 160 may gather a relatively large amount of training data for its classifiers 180 from clients that are associated with different business entities and different application products. Moreover, this approach allows collection of training data that is associated with a relatively large number of programming languages, source code constructs, human auditors, and so forth, which may be beneficial for training the classifiers 180, as further described herein.

As depicted in FIG. 1A, in accordance with example implementations, an anonymization engine 130 may sanitize the audited issue data 114 to provide anonymized audited issue data 132, which may be communicated via the network fabric 140 to the off-site system 160. In accordance with example implementations, the off-site system 160 may include a job manager engine 162, which among its responsibilities, controls routing of the anonymized audited issue data 132 to a data store 166. In this regard, in accordance with example implementations, the off-site system 160 collects anonymized audited issue data (such as data 132) from multiple, remote clients (such as on-site system 110) for purposes of training the classifiers 180. In accordance with further example implementations, the parser engine 112 may provide anonymized data, and the on-site system 110 may not include the anonymization engine 130.

Figure 4:
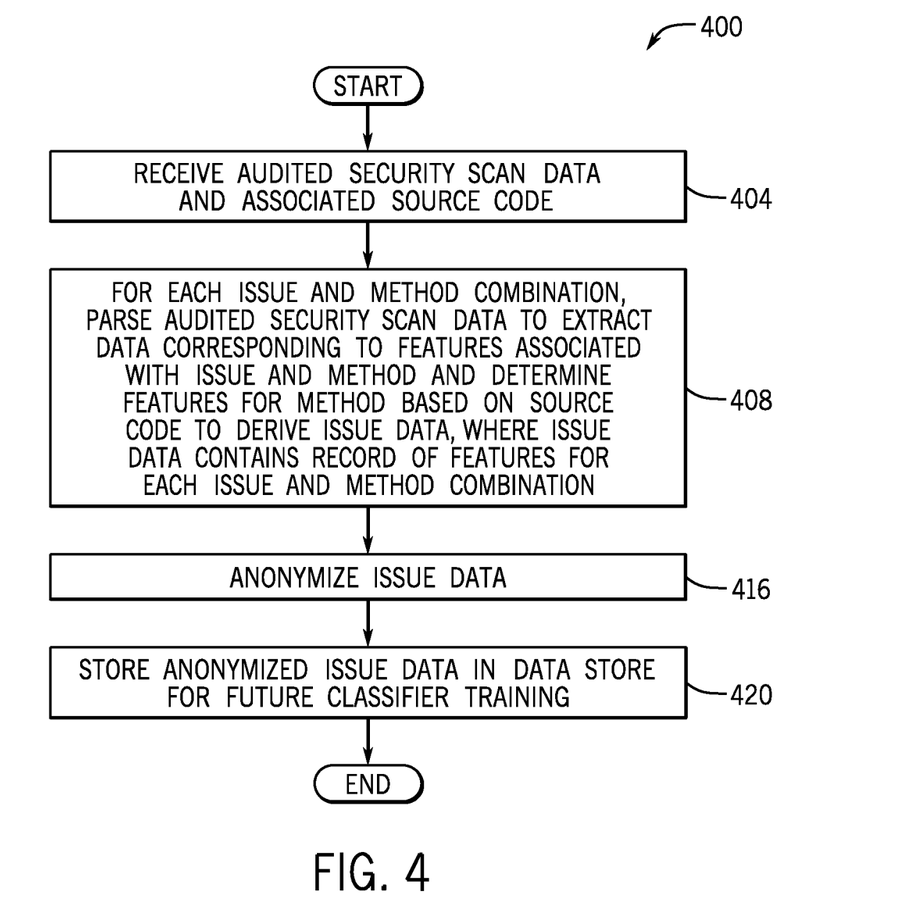
FIG. 4 is a flow diagram depicting a technique to gather training data according to an example implementation.

Referring to FIG. 4, thus, in accordance with example implementations, a technique 400 to gather training data for the classifiers 180 includes receiving (block 404) audited application security scan data and associated source code. For each issue and method combination, the technique includes parsing audited security scan data to extract data corresponding to features that are associated with the issue and method and determining features for the method based on the source code to derive issue data, pursuant to block 408. The issue data contains a record of the features, for each issue and method combination. Pursuant to block 416, the method 300 includes anonymizing the issue data, and the anonymized data is stored (block 420) for future classifier training.

In accordance with example implementations, each classifier 180 is associated with a training policy. Each training policy, in turn, may be associated with a set of filtering parameters 189, which define filtering criteria for selecting training data that corresponds to specific issue attributes, or features, which are to be used to train the classifier 180. In accordance with example implementations, to train a given classifier 180, a training engine 170 of the off-site system 160 selects the set of filter parameters 189 based on the association of the set to the training policy of the classifier 180 to select specific, anonymized audited issue data 172 (FIG. 1A) to be used in the training. Using the selected anonymized issue data 172, the training engine 170 applies a machine learning algorithm to build a classification model for the classifier 180. Depending on the particular implementation, the training engine 170 may be different training policies for all classifiers 180 or may use different training policies for different groups of classifiers 180. Depending on the particular implementation, the training engine 170 may build one of the following classification models (as examples) for the classifiers 180: a support vector machine (SVM) model, a neural network model, a decision tree model, ensemble models, and so forth.

Figure 5:
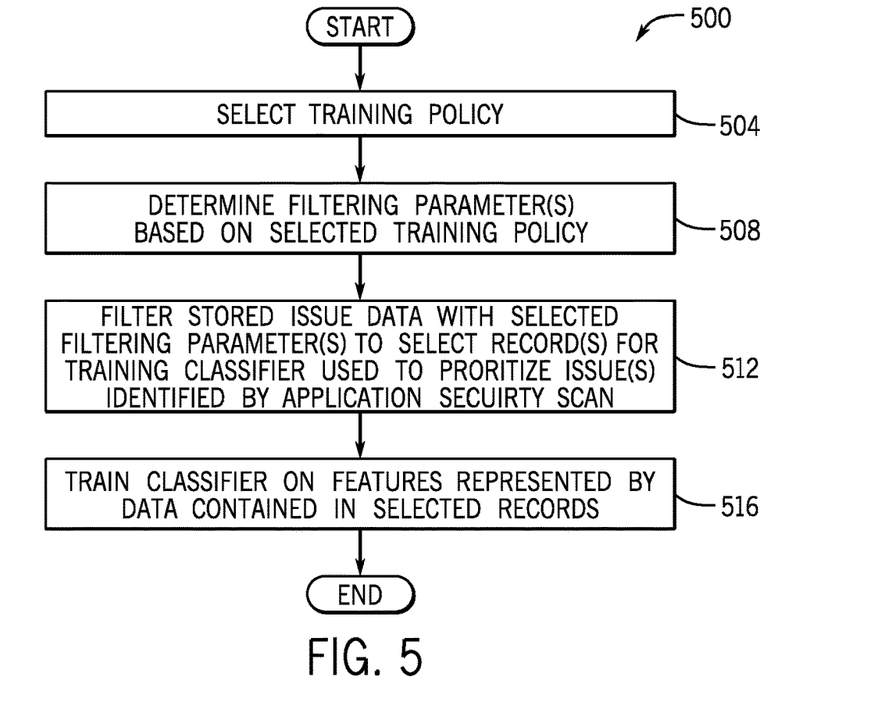

The selected anonymized audited issue data 172 thus, focuses on specific records 204 of the anonymized issue data 132 for training a given classifier 180, so that the classifier 180 is trained on the specific classification preference(s) of the human auditor(s) for the corresponding issue(s) to build a classification model for the issue(s). Thus, referring to FIG. 5, in accordance with example implementations, a technique 500 to train a classifier includes selecting (block 504) a training policy for the classifier and determining (block 508) one or multiple filtering parameters based on the selected training policy. The method 500 includes filtering (block 512) stored issue data with the selected filtering parameter(s) to select one or multiple records for training the classifier and training (block 516) the classifier on features represented by data contained in the selected record(s).

Figure 6:
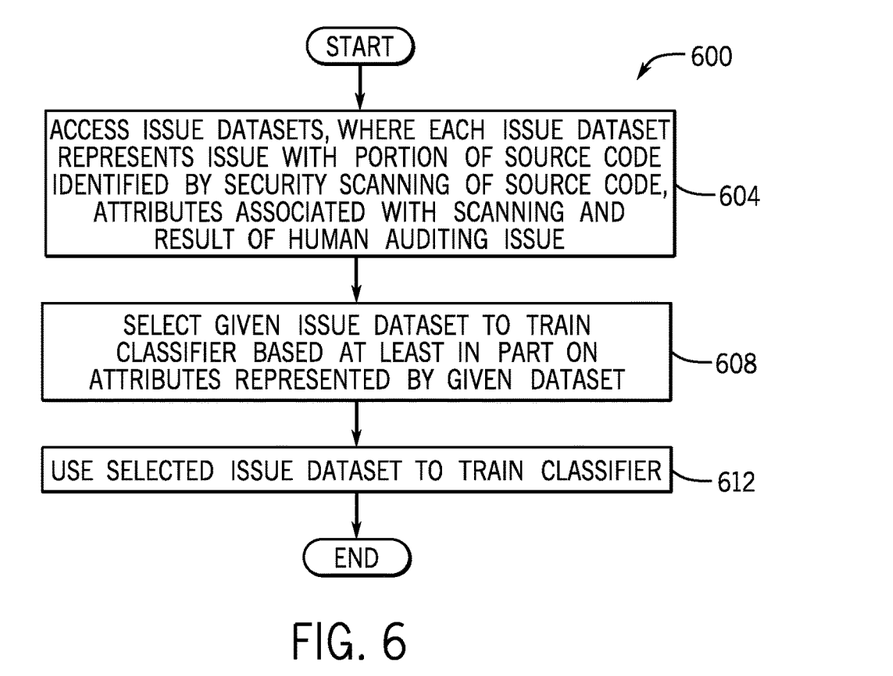

Other ways may be used to select record(s) for training a given classifier 180, in accordance with further implementations. For example, in accordance with another example implementation, an attribute-to-training policy mapping may be applied to the records 204 to map the issue records to corresponding training policies (and thus, map the records 204 to the classifiers 180 that are trained with the records 204). Thus, in general, a technique 600 (see FIG. 6) to train a classifier, in accordance with example implementations, includes accessing (block 604) issue datasets. Each issue dataset represents an issue with a portion of source code, which is identified by the security scanning of the source code, attributes (or features) associated with the scanning, and a result of human auditing of the issue. The technique 600 includes selecting (block 608) a given dataset to train the classifier based at least in part on the attributes and using (block 612) the selected dataset (among other datasets selected in the same manner, for example) to train the classifier.

Figure 1B:
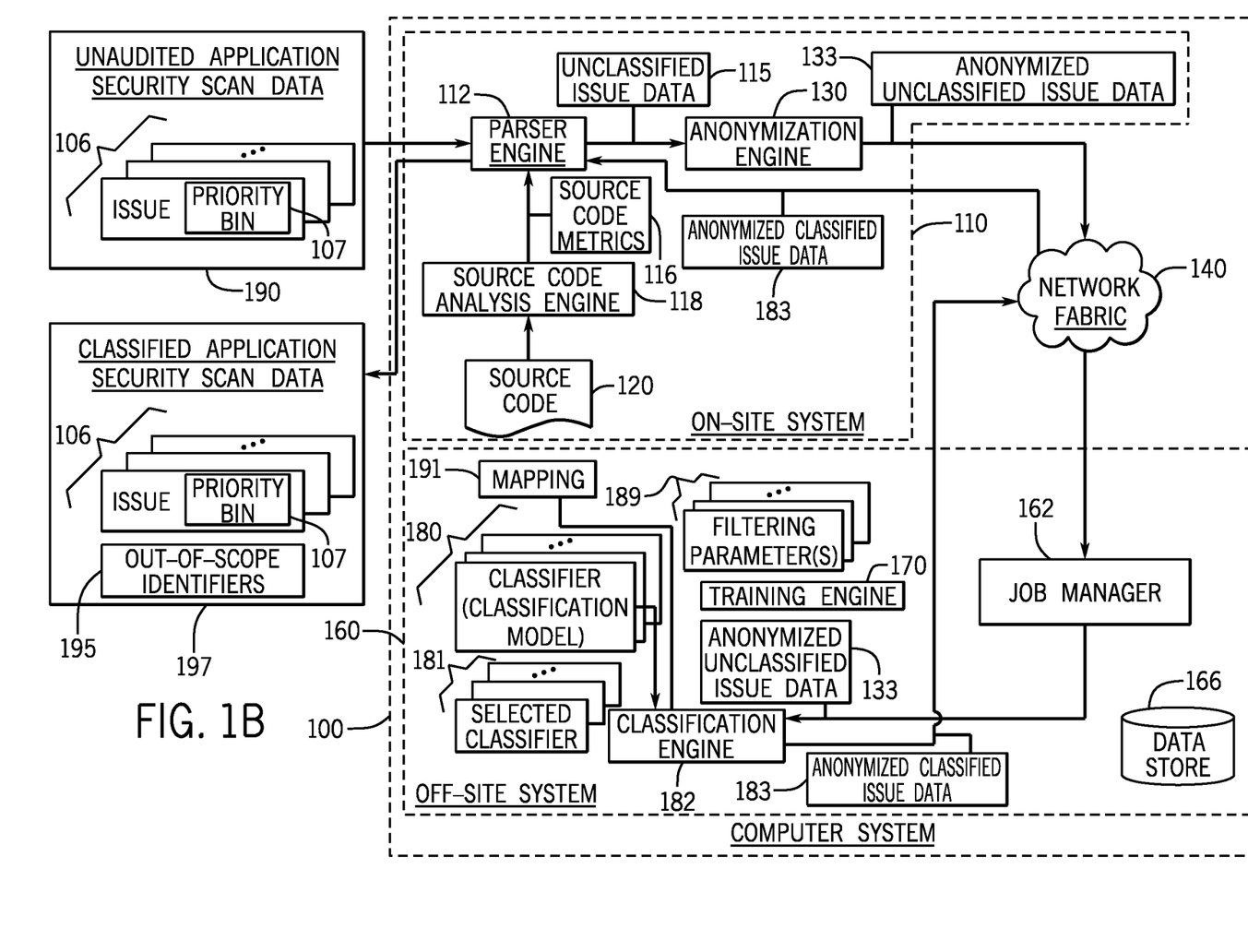
FIG. 1B is a schematic diagram of the computer system of FIG. 1A illustrating the use of the machine classifiers of the system to prioritize issues identified in an application security scan according to an example implementation.

FIG. 1B illustrates data flows of the computer system 100 for purposes of classifying unaudited application security scan data 190 (i.e., the output of an application security scanning engine) to produce corresponding machine classified application security scan data 195. In this manner, the unaudited application security scan data 190 and the classified application security scan data 195 both identify issues 106, which were initially identified by an application security scan. The classified application security scan data 195 contains data representing a machine-classified-based prioritization of the security scan. In this manner, the classified application security scan data 195 may identify out-of-scope issues (as depicted by out-of-scope identifiers 197), priority bins 107 for the in-scope issues 106, priorities for the in-scope issues 106 of a given priority bin 107, and so forth.

More specifically, for the classification to occur, in accordance with some implementations, the parser engine 112 parses the unaudited application security scan data 190 to construct unclassified issue data 115. In accordance with example implementations, similar to the audited issue data 114 discussed above in connection with FIG. 1A, the unclassified issue data 110 is arranged in records; each record is associated with a method and issue combination; and each record contains data representing features derived from the application security scan data 190. Moreover, depending on the particular implementation, each record may also contain data representing features derived from the associated source code 120.

As depicted in FIG. 1B, the anonymization engine 130 of the on-site system 110 sanitizes the unclassified issue data 115 to provide anonymized unclassified issue data 133. The anonymized unclassified issue data 133, in turn, is communicated from the on-site system 110 to the off-site system 160 via the network fabric 140. As depicted in FIG. 1B, the job manager engine 162 routes the anonymized unclassified issue data 133 to the classification engine 182.

In accordance with example implementations, each classifier 180 is associated with a classification policy, which defines the features, or attributes, of the issues that are to be classified by the classifier 180. Moreover, in accordance with example implementations, the classification engine 182 may apply an attribute-to-classifier mapping 191 to the anonymized classified issue data 183 for purposes of sorting the records 204 of the data 182 according to the appropriate classification policies (and correspondingly sort the records 204 to identify the appropriate classifiers 180 to be applied to prioritize the results).

The classification engine 182 applies the classifiers 180 to the records 204 that conform to the corresponding classification policies. Thus, by applying the attribute-to-classification policy mapping 191 to the anonymized unclassified issue data 133, the classification engine 182 may associate the records of the data 133 with the predefined classification policies and apply the corresponding selected classifiers 182 to the appropriate records 204 to classify the records. This classification results in anonymized classified issue data 183. The anonymized classified issue data 183, in turn, may be communicated via the network fabric 140 to the on-site system 110 where the data 183 is received by the parser engine 112. In accordance with example implementations, the parser engine 112 performs a reverse transformation anonymized of the classified issue data 183, de-anonymizes the data and arranges the data in the format associated with the output of the security scanning engine to provide the classified application security scan data 195.

Figure 7:
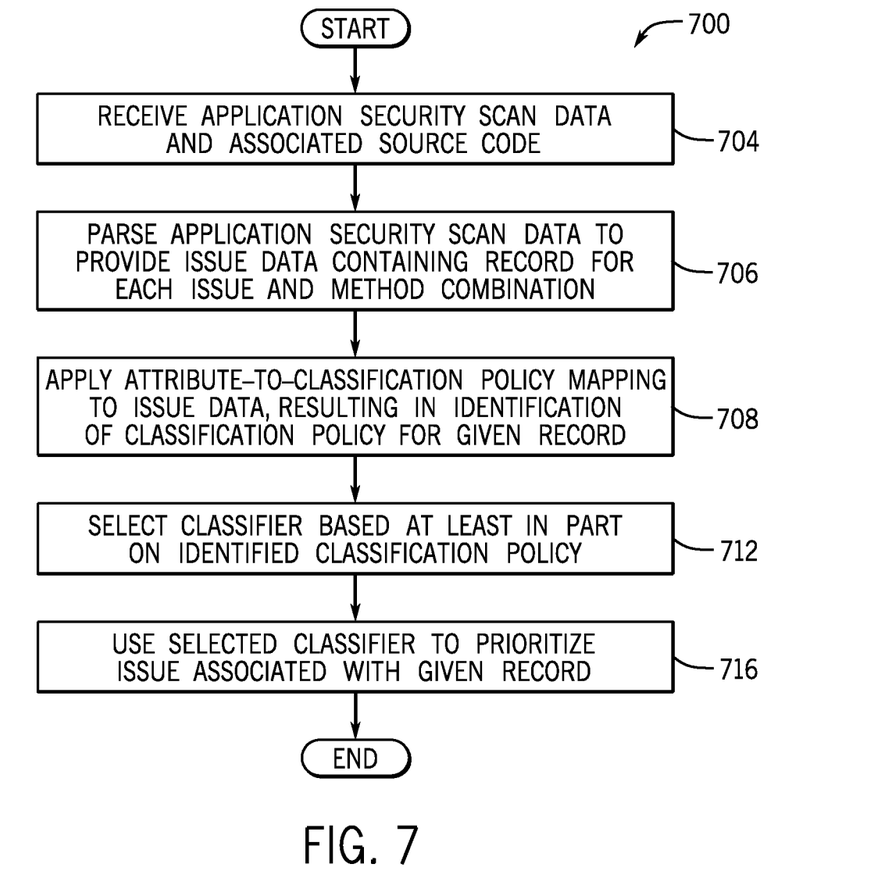
FIGS. 7 and 8 are flow diagrams depicting techniques to prioritize issues identified by an application security scan using machine classifiers according to example implementations.

Thus, in accordance with example implementations, a technique 700 (see FIG. 7) to classify an issue associated with a given record 204 includes receiving (block 704) and application security scan data and associated source code. The technique 700 includes parsing (block 506) the application security scan data to provide issue data, which contains a record for each issue and method combination;

and the technique 700 includes applying (block 708) an attribute-to-classification policy mapping to the issue data, resulting in identification of a classification category for the given record. A classifier may then be selected (block 712) based on the identified classification policy, and the selected classifier may be used (block 716) to prioritize the issue that is associated with the given record.

Figure 8:
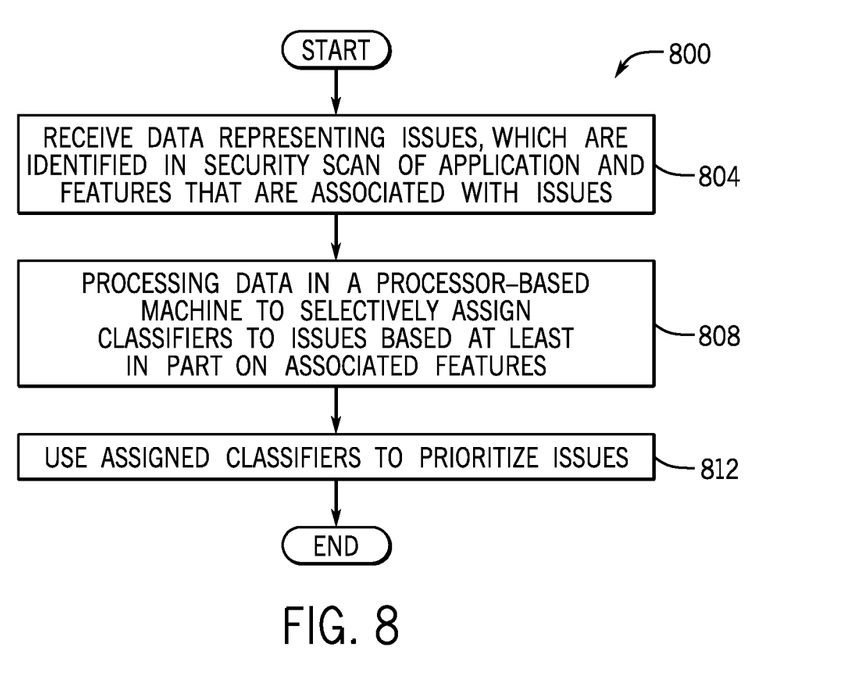

Other ways may be used to select a classifier 180 for prioritizing a given issue, in accordance with further implementations. For example, in accordance with another example implementation, the issue data may be filtered through different filters (each being associated with a different classification policy) for purposes of associating the records with classification policies (and classifiers 180). Thus, in general, a technique 800 (see FIG. 8) to classify an issue includes receiving (block 804) data representing an issues, which was identified in a security scan in an application and features that are associated with the issue; and processing (block 808) the data in a processor-based machine to selectively assign a classifier to the issues based at least in part on the features. The technique 800 includes using the assigned classifiers to classify the issue, pursuant to block 812.

A given training policy or classification policy may be associated with one or multiple issue features. For example, a given classification policy may specify that an associated classifier 180 is to be used to prioritize issues that have a certain set of features; and likewise a given training policy for a classifier 180 may specify that an associated classifier is to be trained on issue data having a certain set of features. It is noted that, in accordance with example implementations, it is not guaranteed that the issue attribute-to-classifier mapping corresponds to the sum total of the training policies of the relevant classifiers 180. This allows for the classification policy for a given classifier 180 to allow an issue record to be used for a given the classifier 180 for classification purposes, even though that issue's attributes (and thus, the record) may be excluded for training of the classifier 180 by the classifier's training policy.

As a more specific example, a particular classification or training policy may be associated with an issue type and the identification (ID) of a particular human auditor who may be preferred for his/her classification of the associated issue type. In this manner, the skills of a particular human auditor may highly regarded for purposes of classifying a particular issue/method combination due to the auditor's overall experience, skill pertaining to the issue or experience with a particular programming language.

The classification or training policy may be associated with characteristics other than a particular human auditor ID. For example, the classification or training policy may be associated with one or multiple characteristics of the method (s). The classification or training policy may be associated with one or multiple features pertaining to the degree of complexity of the method. The classification or training policy may be associated with methods that exceed or are below a particular data or control flow count threshold; exceed or are below a particular data or control length threshold; exceed or are below a count threshold for a collection of selected source code constructs; have a number of exceptions that exceed or are below a threshold; have a number of branches that exceed or are below a threshold; and so forth. As another example, the classification or training policy may be associated with the programming language associated with the method(s).

As other examples, the classification or training policy may be associated with one or multiple characteristics of the application security scanning engine. For example, the classification or training policy may be associated with a particular ID, date range, or version of the application security engine. The classification or training policy may be associated with one or multiple characteristics of the scan, such as a particular date range when the scan was performed; a confidence assessed by the application scanning engine within a particular range of confidences, an accuracy of the scan within a particular range of accuracies; a particular ID, date range, or version of the application security engine; and so forth. Moreover, the classification or training policy may be associated with an arbitrary feature, which is included in the record and is specified by a customer.

As a more specific example, a particular classification or training policy may be associated with the following characteristics that are identified from the features or attributes of the issue record: Human Auditor A, the Java programming language, an application security scan that was performed in the last two years, and a specific issue type (a flow control issue, for example).

Figure 9:
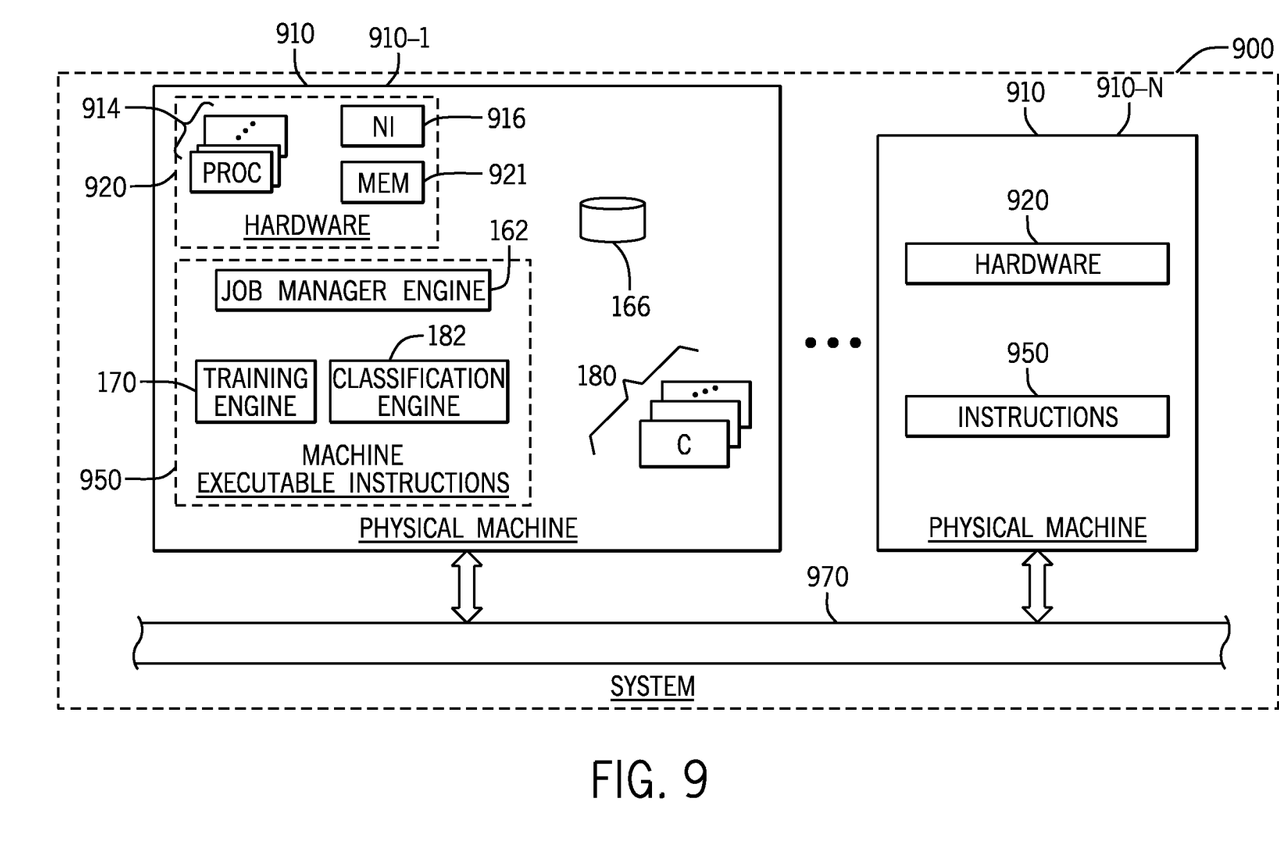
FIG. 9 is a schematic diagram of a physical machine according to an example implementation.

Referring to FIG. 9 in conjunction with FIG. 1A, in accordance with example implementations, the on-site system 110 and/or off-site system 160 may each have an architecture that is similar to the architecture that is depicted in FIG. 9. In this manner, the architecture may be in the form of a system 900 that includes one or more physical machines 910 (N physical machines 910-1 . . . 9-10-N, being depicted as examples in FIG. 9). The physical machine 910 is an actual machine that is made up of actual hardware 920 and actual machine executable instructions 950. Although the physical machines 910 are depicted in FIG. 9 as being contained within corresponding boxes, a particular physical machine may be a distributed machine, which has multiple nodes that provide a distributed and parallel processing system.

In accordance with exemplary implementations, the physical machine 910 may be located within one cabinet (or rack); or alternatively, the physical machine 910 may be located in multiple cabinets (or racks).

A given physical machine 910 may include such hardware 920 as one or more processors 914 and a memory 921 that stores machine executable instructions 950, application data, configuration data and so forth. In general, the processor(s) 914 may be a processing core, a central processing unit (CPU), and so forth. Moreover, in general, the memory 921 is a non-transitory memory, which may include semiconductor storage devices, magnetic storage devices, optical storage devices, and so forth. In accordance with example implementations, the memory 921 may store data representing the data store 166 and data representing the one or more classifiers 180 (i.e., classification models). The data store and/or classifiers 180 may be stored in another type of storage device (magnetic storage, optical storage, and so forth), in accordance with further implementations.

The physical machine 910 may include various other hardware components, such as a network interface 916 and one or more of the following: mass storage drives; a display, input devices, such as a mouse and a keyboard; removable media devices; and so forth.

For the example implementation in which the system 900 is used for the off-site system 160 (depicted in FIG. 9), the machine executable instructions 950 may, when executed by the processor(s) 914, cause the processor(s) 914 to form one or more of the job manager engine 162, training engine 170 and classification engine 182. It is noted that although FIG. 9 depicts an example implementation for the off-site system 160, for example implementations in which the system 900 is used for the on-site system 110, the machine-executable instructions 950 may, when executed by the processor(s) 914, cause the processor(s) 914 to form one or more of the parser engine 112, source code analysis engine 118 and anonymization engine 130.

In accordance with further example implementations, one of more of the components of the off-site system 160 and/or on-site system 110 may be constructed as a hardware component that is formed from dedicated hardware (one or more integrated circuits, for example). Thus, the components may take on one or many different forms and may be based on software and/or hardware, depending on the particular implementation.

In general, the physical machines 910 may communicate with each other over a communication link 970. This communication link 970, in turn, may be coupled to the network fabric 140 and may contain one or more multiple buses or fast interconnects.

As an example, the system 900 may be an application server farm, a cloud server farm, a storage server farm (or storage area network), a web server farm, a switch, a router farm, and so forth. Although two physical machines 910 (physical machines 910-1 and 910-N) are depicted in FIG. 9 for purposes of a non-limiting example, it is understood that the system 900 may contain a single physical machine 910 or may contain more than two physical machines 910, depending on the particular implementation (i.e., "N" may be "1," "2," or a number greater than "2").

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. A method comprising:
   receiving data representing an output of a security scan of an application and an audit of the output of the security scan by a human auditor, the output representing a security issue with the application identified by the security scan and the audit representing an analysis of the security issue by the human auditor; and
   training a security scan classifier to learn a classification preference of the human auditor, wherein training the security scan classifier comprises processing the data in a processor-based machine to, based at least in part on the output of the security scan and the analysis of the security scan by the human auditor, learn the classification preference of the human auditor to the security issue to build a classification model for the security issue.

2. The method of claim 1, wherein the audit identifies a determination by the human auditor whether the security issue identified by the security scan is a false positive, and training the security scan classifier to learn the classification preference comprises training the security scan classifier based at least in part on the determination by the human auditor.

3. The method of claim 1, wherein the data identifies a first order priority level of a plurality of first order priority levels for the security issue identified by the security scan, and training the security scan classifier further comprises training the security scan classifier based at least in part on the identified first order priority level.

4. The method of claim 3, wherein the audit identifies a second order priority level for the security issue of a plurality of second order priority levels, and training the security scan classifier further comprises training the security scan classifier based at least in part on the second order priority level.

5. The method of claim 1, further comprising determining at least one metric characterizing source code of the application and training the security scan classifier based on the at least one metric, wherein the at least one metric comprises at least one of the following: a data flow count, a data flow length, a data flow complexity, a control flow count, a control flow length and a control flow complexity.

6. The method of claim 1, further comprising:
   identifying source code constructs of the application and determining a histogram of the identified source code constructs; and
   training the security scan classifier comprises based at least in part on,
   at least one construct count indicated by the histogram.

7. The method of claim 1, wherein receiving the data comprises receiving anonymized data.

8. An article comprising a non-transitory computer readable storage medium to store instructions that when executed by a processor-based machine cause the processor-based machine to:
   receive issue data comprising a plurality of records, wherein each record of the plurality of records is associated with an issue of a plurality of issues identified by a security scan of source code and a method of the source code responsible for the associated issue, and each record comprising data identifying human audit-based classification of the associated issue; and
   train a classifier based on the issue data to learn human audit issue preferences.

9. The article of claim 8, the storage medium storing instructions that when executed by the computer readable storage medium cause the processor-based machine to train the classifier based on frequencies of constructs contained in the source code.

10. The article of claim 8, the storage medium storing instructions that when executed by the computer readable storage medium cause the processor-based machine to train the classifier based on features identified by the security scan.

11. The article of claim 8, the storage medium storing instructions that when executed by the computer readable storage medium cause the processor-based machine to train the classifier based on features of the source code other than features identified by the security scan.

12. A system comprising:
   a parser engine comprising a processor to provide a classified dataset, the parser engine to:
      receive data representing an output of an application security scan, the output identifying security issues;
      parse the output to determine data for a predetermined set of features for a given security issue of the identified security issues; and
      generate the classified dataset based at least in part on the data for the predetermined set of features and on a result of a human audit of the output pertaining to the given security issue; and
   a training engine comprising a processor to train a classifier for the security issue based at least in part on the classified dataset.

13. The system of claim 12, wherein the training engine further trains the classifier based at least in part on machine executable instructions of an application associated with the security issue.

14. The system of claim 12, wherein the result of the human audit represents a classification of the security issue as being either true or false.

15. The system of claim 12, wherein the parser engine selects the predetermined set of features from a plurality of sets of predetermined features based at least in part on the given security issue.

16. The method of claim 1, wherein the data identifies a first order priority level of a plurality of first order priority levels for the security issue identified by the security scan.

17. The method of claim 1, wherein the output represents multiple security issues comprising the security issue, wherein the data identifies a priority level for each of the security issues, and wherein the data identifies a first order priority level of a plurality of first order priority levels for the security issue identified by the security scan.

18. The method of claim 1, wherein the output represents multiple security issues comprising the security issue, wherein each of the security issues is assigned to a priority bin, and wherein the data identifies a first order priority level of a plurality of first order priority levels for the security issue identified by the security scan.

19. The method of claim 1, wherein the output represents multiple security issues comprising the security issue, wherein each of the security issues is assigned to a priority bin.

20. The method of claim 1, wherein the data identifies a priority level of a plurality of priority levels for the security issue identified by the security scan, and training the security scan classifier further comprises training the security scan classifier based at least in part on the identified priority level of the plurality of priority levels.

* * * * *